(12) United States Patent
Doi et al.

(10) Patent No.: US 7,898,704 B2
(45) Date of Patent: Mar. 1, 2011

(54) IMAGE OUTPUT CONTROLLER

(75) Inventors: Takashi Doi, Matsumoto (JP);
Yoshihiko Matsuzawa, Matsumoto (JP);
Michinao Osawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 964 days.

(21) Appl. No.: 11/727,734

(22) Filed: Mar. 28, 2007

(65) Prior Publication Data
US 2007/0229870 A1  Oct. 4, 2007

(30) Foreign Application Priority Data
Mar. 28, 2006  (JP) .................................. 2006-087360

(51) Int. Cl.
*H04N 1/60*  (2006.01)
(52) U.S. Cl. ......... 358/504; 358/1.9; 358/3.24; 358/518; 382/162; 382/167; 399/74; 399/72
(58) Field of Classification Search .................. 358/1.9, 358/3.24, 504, 518; 382/162, 167; 399/74, 399/72
See application file for complete search history.

(56) References Cited

U.S. PATENT DOCUMENTS
7,486,414 B2    2/2009  Arai
2006/0232771 A1 * 10/2006  VanDuyn et al. .......... 356/243.5

FOREIGN PATENT DOCUMENTS
JP   2005-161650 A    6/2005
JP   2005-275855 A   10/2005
JP    2005275855 A * 10/2005

* cited by examiner

*Primary Examiner* — King Y Poon
*Assistant Examiner* — Jamares Washington
(74) *Attorney, Agent, or Firm* — Sughrue Mion, PLLC

(57) ABSTRACT

An image output controller is capable of directly or indirectly controlling a printer printing a color chart and a color measuring apparatus carrying out color measurement for the color chart. When color authentication is executed for an optionally set image, a process is carried out in relation to user's setting or automatic optimization including at least one of a printing position of the color chart, a layout of the color chart and a color value of the color chart. The printer is controlled according to a printing condition based on the user's setting or the automatic optimization so that the color chart is printed on a sheet of predetermined printing paper. The color measuring apparatus is controlled so as to carry out color measurement for the printed color chart.

11 Claims, 15 Drawing Sheets

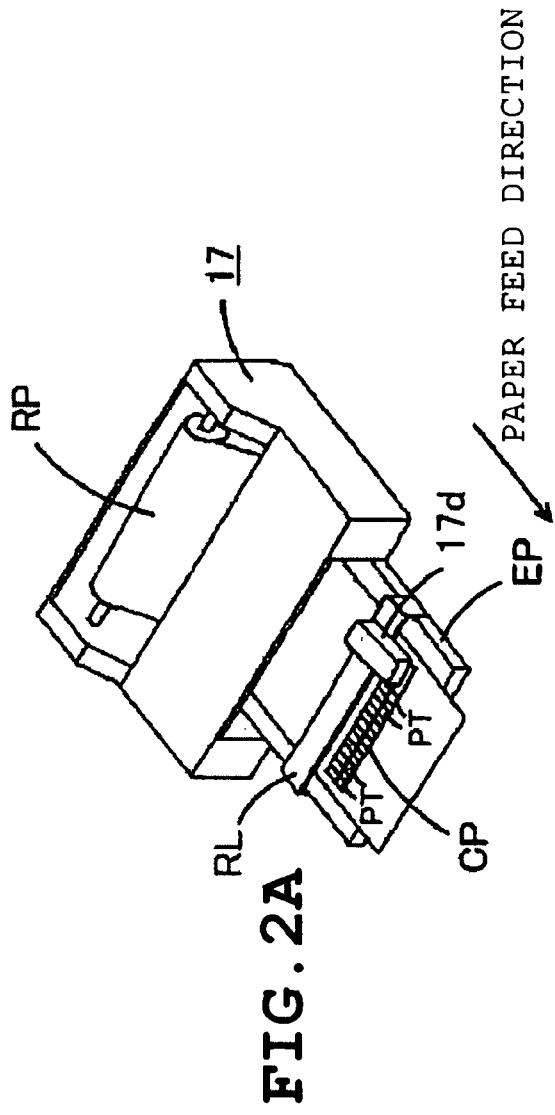
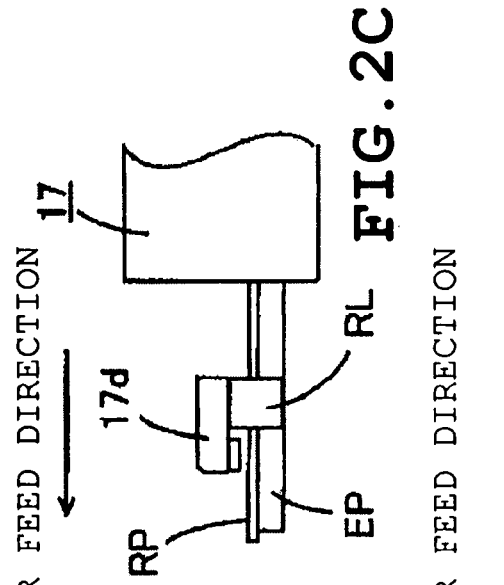
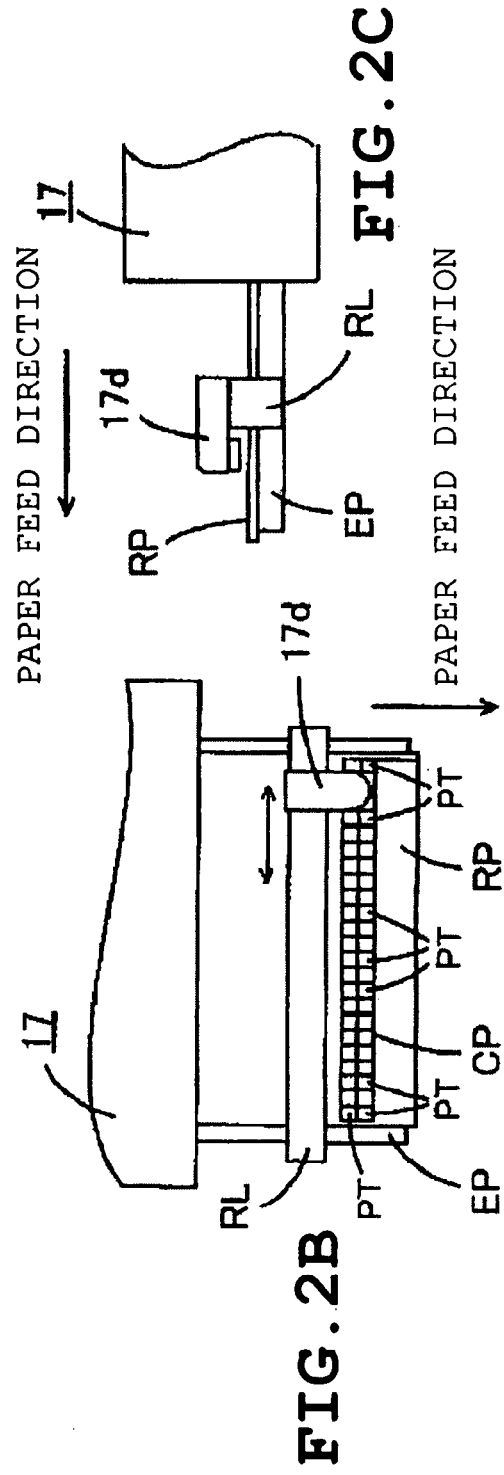
FIG. 2A
FIG. 2B
FIG. 2C

```
DEFINITION PATCH
Target PX-9xxx_PGPP_2814_Standard

A1: 1.23    K1: 0.70    A2: 1.52    K2: 2.67
B1: 1.50    L1: 0.64    B2: 2.64    L2: 1.10
C1: 1.90    M1: 1.20    C2: 4.78    M2: 0.95
D1: 0.82    N1: 1.42    D2: 1.85    N2: 1.44
E1: 1.20    O1: 1.15    E2: 2.78    O2: 1.87
F1: 2.10    P1: 1.15    F2: 3.85    P2: 0.88
G1: 1.50    Q1: 0.11    G2: 1.45    Q2: 0.91
H1: 5.62    R1: 0.51    H2: 2.12    R2: 0.55
I1: 3.54    S1: 0.75    I2: 3.10    S2: 1.12
J1: 0.53    T1: 2.36    J2: 3.50    T2: 1.42
```

```
USER DESIGNATED PATCH
                      Target

U1: 2.60  COLOR SAMPLE A_ORANGE
V1: 6.21  COLOR SAMPLE B_DARK BLUE
U2: 3.21  (L*a*b*)=(50, -70, 20)
V2: 2.11  (L*a*b*)=(20, 30, -40)
```

FIG. 8A

```
AUTHENTICATION RESULT: OK
PRINTER: PX-xx  S/No: XXXX
Target PX-9xxx_PGPP_2814_Standard
DEFINITION PATCH ΔE
   WHOLE:      Ave: 1.76   Max: 5.62      C: Ave: 1.54  Max: 1.90
   GRAY:       Ave: 0.97   Max: 2.36      M: Ave: 1.37  Max: 2.10
   FLESH COLOR:Ave: 1.26   Max: 1.87      Y: Ave: 3.55  Max: 5.62
                                          R: Ave: 2.98  Max: 4.78
                                          G: Ave: 2.83  Max: 3.85
                                          B: Ave: 2.22  Max: 3.10
```

```
                                                    06/01/12
USER DESIGNATED PATCH
Patch Target                                          ΔE
 U1:  COLOR SAMPLE A_ORANGE                          2.26
 V1:  COLOR SAMPLE B_DARK BLUE                       6.21
 U2:  (L*a*b*)=(50, -70, 20)                         3.21
 V2:  (L*a*b*)=(20, 30, -40)                         2.11
```

AUTHENTICATION RESULT:  OK
PRINTER:  PX-xx  S/No:  XXXX
Target PX-9xxx_PGPP_2814_Standard
DEFINITION PATCH ΔE
      WHOLE:  Ave: 1.76    Max: 5.62
       GRAY:  Ave: 0.97    Max: 2.36
FLESH COLOR:  Ave: 1.26    Max: 1.87

USER DESIGNATED PATCH
Patch Target                              ΔE
 U1:  COLOR SAMPLE A_ORANGE              2.26
 V1:  COLOR SAMPLE B_DARK BLUE           6.21
 U2:  (L*a*b*) = (50, -70,  20)          3.21
 V2:  (L*a*b*) = (20,  30, -40)          2.11
```

AUTHENTICATION RESULT:  OK
PRINTER:  PX-xx  S/No:  XXXX
Target PX-9xxx_PGPP_2814_Standard
DEFINITION PATCH ΔE
  WHOLE:  Ave: 1.76    Max: 5.62
```

```
                                                    06/01/12
AUTHENTICATION RESULT: NG
PRINTER: PX-xx  S/No: XXXX
Target PX-9xxx_PGPP_2814_Standard
DEFINITION PATCH ΔE
   WHOLE:       Ave: 1.76    Max: 5.62
   GRAY:        Ave: 0.97    Max: 2.36
   FLESH COLOR: Ave: 1.26    Max: 1.87
USER DESIGNATED PATCH
Patch Target                                    ΔE
   U1:  COLOR SAMPLE A ORANGE                  2.26
   V1:  COLOR SAMPLE B DARK BLUE               6.21
   U2:  (L*a*b*)=(50, -70, 20)                 3.21
   V2:  (L*a*b*)=(20, 30, -40)                 2.11
```

FIG. 9B

```
AUTHENTICATION RESULT: NG
PRINTER: PX-xx  S/No: XXXX
Target PX-9xxx_PGPP_2814_Standard
DEFINITION PATCH ΔE
   WHOLE:       Ave: 1.76    Max: 5.62    C: Ave: 1.54   Max: 1.90
   GRAY:        Ave: 0.97    Max: 2.36    M: Ave: 1.37   Max: 2.10
   FLESH COLOR: Ave: 1.26    Max: 1.87    Y: Ave: 3.55   Max: 5.62
                                          R: Ave: 2.98   Max: 4.78
                                          G: Ave: 2.83   Max: 3.85
                                          B: Ave: 2.22   Max: 3.10
```

```
                                              06/01/12
AUTHENTICATION RESULT:  NG
PRINTER:  PX-xx   S/No:  XXXX
Target PX-9xxx_PGPP_2814_Standard
DEFINITION PATCH ΔE
        WHOLE:  ⌞Ave: 1.76⌟   Max: 5.62
```

FIG. 9C

```
                                              06/01/12
AUTHENTICATION RESULT:  NG
PRINTER:  PX-xx   S/No:  XXXX
Target PX-9xxx_PGPP_2814_Standard
DEFINITION PATCH ΔE
        WHOLE:  Ave: 1.76   Max: 5.62   (H1)
```

FIG. 9D

| CLIENT | PRODUCT | TYPE OF COLOR CHART | ALLOWABLE COLOR RANGE |
|---|---|---|---|
| COMPANY A | BOOK | PATTERN A1 | RANGE A1 |
| | GRAVURE | PATTERN A2 | RANGE A2 |
| | --- | --- | --- |
| COMPANY B | BOOK | PATTERN B1 | RANGE B1 |
| | GRAVURE | PATTERN B2 | RANGE B2 |
| | --- | --- | --- |
| ------ | ------ | ------ | ------ |
| OTHERS | BOOK | PATTERN X1 | RANGE X1 |
| | GRAVURE | PATTERN X2 | RANGE X2 |
| | --- | --- | --- |

FIG. 10

IMAGE OUTPUT CONTROLLER

CROSS-REFERENCE TO RELATED APPLICATIONS

The entire disclosure of Japanese Patent Application No. 2006-87360, filed Mar. 28, 2006, is expressly incorporated by reference herein.

BACKGROUND OF THE INVENTION

1. Field of the Invention

This invention relates to an image output controller which controls output (printing) of a printed image by a predetermined printer and a method thereof, and more particularly to such an image output controller suitable for use in production of proof (a certificate of color authentication) and method therefor.

2. Description of the Related Art

When images are generally printed by color printers, an intended color (correct color) is not sometimes reproduced (printed) for the reasons of color variations (changes in color) due to a printing environment (for example, temperature, humidity etc.), changes in color due to malfunction of a printer (for example, blockage in a nozzle, changes in color material (for example, ink), paper incompatibility, error in color conversion, etc.), production tolerance due to individual differences of printers or the like. In view of the problem, a color chart is printed together with an object (an image to be certified) on the same paper or in continuity on a plurality of sheets of paper, as disclosed in JP-A-2005-275855. As a result, proof (a certificate of color authentication) is produced, thereby certifying that the image is printed using correct colors and accordingly, guaranteeing the quality of print.

More specifically, in JP-A-2005-275855, the image output controller controls a printer so that a predetermined color chart is printed by the printer and further controls a suitable colorimetry device so that colorimetry is carried out for the printed color chart. The image output controller determines whether a result of the colorimetry is normal, while printing any image which is an object.

Consequently, a result of determination is printed on a single sheet of paper (printing paper) as well as the aforesaid color chart and object. More specifically, when the result of colorimetry is normal, the color chart, object (an image to be color-certified) and indication of certificate (indicating that the image is printed using correct colors) are printed in continuity on a single sheet of paper, whereby the aforesaid proof (a certificate of color authentication) is produced as the aforesaid print.

However, the color reproducibility for which clients have recently asked for guarantee is not always uniform or rather, the clients have asked for certificates based on different guarantee contents depending upon clients themselves or products they handle. However, the image output controller disclosed in JP-A-2005-275855 carries out the aforesaid color authentication using a previously determined single color chart. Accordingly, in some cases, the image output control device cannot sufficiently meet a variety of guarantee contents the clients seek.

SUMMARY OF THE INVENTION

The present invention was made in view of the foregoing circumstances and an object thereof is to provide an image output controller which can flexibly deal with a variety of guarantee contents the clients seek when a proof (a certificate of color authentication) guarantees that an image is printed in correct colors.

To achieve the object, the present invention provides an image output controller controlling output (printing) of an image to be printed by a predetermined printer. The image output controller is capable of directly or indirectly (for example, via a predetermined apparatus or device) controlling a printer printing a color chart comprised of an optionally settable color chart and a color measuring apparatus carrying out color measurement for the color chart. When color authentication is executed for an optionally set image, a process is carried out in relation to user's setting or automatic optimization including at least one of a printing position of the color chart, a layout (including a shape, number and size of the color chart) of the color chart and a color value of the color chart. The printer is controlled according to a printing condition based on the user's setting or the automatic optimization so that the color chart is printed on a sheet of predetermined printing paper. The color measuring apparatus is controlled so as to carry out color measurement for the printed color chart.

According to the above-described arrangement of the image output controller, the printing position of the color chart, the layout of the color chart and a color value of the color chart are set so as to be optimum at operator's option or automatically according to a printing condition or the like, whereby operator's preference is reflected, the accuracy and reliability of the color measurement are improved, and the number of the printing paper is reduced. Thus, the aforesaid color authentication is carried out in an optimum form according to purposes. Moreover, even when various pieces of hardware (components) such as the aforesaid printer and color measuring apparatus is changed (for example, model change), the above-described arrangement can cope with the change flexibly. More specifically, if the aforesaid proof (a certificate of color authentication) is to be produced using such an apparatus, warranty information a client seeks can be coped with flexibly even when the warranty information is versatile.

When the color reproducibility is authenticated (color authentication) using such an apparatus as described above, the authentication can employ various methods including a method of determining the quality (suitable/unsuitable) depending upon whether a measured color value is within an allowable color range or a method of determining the quality (suitable/unsuitable) by computing color difference between a reference value (target color value) and a color chart value (color value of the color chart). Furthermore, these methods can be combined together.

Furthermore, since optimum conditions of the color measurement differ depending upon the parameters (printing position, color chart layout and color chart color value) related to the above-described color chart, it is preferable to carry out an automatic optimization of color measurement conditions (start position of color measurement, color measurement range, allowable color range, etc.) together with setting of these parameters.

Furthermore, in another embodiment of the invention, the image output controller is arranged so that when at least a result of the color measurement is normal, the image which is an object of the color chart and color authentication is printed on a single sheet of paper or in continuity on a plurality of sheets of paper. In this case, a certificate of color authentication (proof) which is used, for example, as quality certificate of printing can be produced by a sequence of processing easily but accurately. Moreover, since the aforesaid printing position, color chart layout and color chart color value are set as optimum values at user's option or automatically according to the printing requirements etc., user's preference can be reflected, the precision and reliability of color measurement can be improved or the printing paper can be saved. Thus, proof can be produced in an optimum form as usage.

Furthermore, in another embodiment of the invention, it is effective that the image out controller comprises a color determining unit which determines whether the result of color measurement is normal, depending upon whether the result of color measurement is within a predetermined allowable color range and is arranged so that when the color determining unit determines that the result of color measurement by the color measuring apparatus is not normal, printing of the image which is the object of the color chart is canceled when the printing is scheduled after printing of the color chart or interrupted in a case where the image is being printed after the color chart has been printed and so that at least when the color determining unit determines that the result of color measurement is normal, the image which is the object of the color chart is printed together with a result of determination by the color determining unit.

Thus, when the result of color measurement by the color measuring apparatus is not normal (unsuitable for authentication) in the arrangement that determination of color authentication (quality determination) is carried out as well as color measurement, the image which is an object of the aforesaid color authentication is not printed. As a result, consumable goods of the printer, such as ink can be saved. Furthermore, at least when the result of color measurement is normal (suitable), the object (image as the object of color authentication) is printed as well as the result of determination for the color authentication (suitable or unsuitable). As a result, proof can clearly show that the color authentication has been carried out. When the authentication result indicative of unsuitableness is also printed, the proof can more clearly show that the color authentication has been carried out. Accordingly, the management of certificate (proof) of color authentication) can be rendered easier and consequently, the number of errors in the management can be reduced. Furthermore, since the proof gives approval, client can be given feeling of security. More specifically, high-value added proof can automatically be produced.

In another embodiment of the invention, it is effective that the image output controller comprises a color determining unit which determines whether the result of color measurement is normal, depending upon whether the result of color measurement is within a predetermined allowable color range and that at least when the color determining unit determines that the result of color measurement is not normal, the image which is the object of the color chart is printed together with a result of determination by the color determining unit and a portion which is not normal is indicated so as to be visually recognizable (for example, the portion which is not normal is encircled, not encircled with the other portion being encircled, is changed in color or is marked). Consequently, an unsuitable portion can easily be confirmed (visually perceived) even when a number of results of color measurement are present.

In another embodiment of the invention, it is effective that the image output controller comprises a processing program including a plurality of predetermined processes which are uniquely set so as to correspond to a plurality of predetermined conditions (for example, clients (company A, company B), products (books, gravure) or types of images which are objects to be certified) respectively and that the image output controller determining which one of the processes of the processing program corresponds to a process related to automatic optimization of at least one of a printing position of the color chart, a layout of the color chart and a color value of the color chart, refers to the processing table, thereby executing the process corresponding to the determined condition. When such a table is used, the process related to the above automatic optimization is suitably realized (carried out) without complication of control.

In another embodiment of the invention, it is effective that the image output controller detects a layout of the image which is an object of the color chart in case of a process related to automatic optimization of the printing position of the color chart, prints the color chart on a space area when the image layout to be detected has the space area, and prints the color chart on an end of the paper when the image layout has no space area.

When the image layout to be detected has a space area, the color chart is printed on the space area, whereupon printing paper can be saved (in the length in case of roll paper and in the number of sheets in case of paper of a predetermined size) and thus, the aforesaid information about color authentication (for example, results of determination, color difference, etc.) can be printed on the saved space. However, since the color chart is cut away after printing in many cases, it is convenient that the color chart is printed on an end of the printing paper (easy to be cut away well). According to the above-described arrangement, in this regard, when the layout of the image which is an object of color authentication has a space area, a printing space and accordingly printing paper can be saved (the color chart is printed on the space area). On the other hand, when such saving cannot be obtained, that is, when the layout of the image which is an object of color authentication has no space area, the color chart is printed on the end of the printing paper, whereby a printing layout considering the case where the color chart is cut away after printing can be realized.

In another embodiment of the invention, it is effective that the image output controller is arranged to detect an allowable color measurement range of the color measuring apparatus in case of a process related to automatic optimization of the printing position of the color chart (strictly, scheduled printing position) and carries out a position correction when the printing position of the color chart (scheduled printing position) is outside the allowable color measurement range to be detected, so that the printing position of the color chart falls within the allowable color measurement range to be detected.

When a high accuracy color measurement is carried out by a simple control manner, a color-measurable range of the color measuring apparatus is subjected to certain limitation in many cases. In this case, when the color chart is printed outside the color-measurable range of the color measuring apparatus, a sufficient accuracy in the color measurement cannot be obtained or the color measurement cannot be carried out. In each case, the color measurement cannot be carried out. According to the above-described arrangement, in this regard, the color chart is printed so as to fall within the color-measurable range, whereupon the aforesaid color measurement can be carried out with high accuracy reliably.

In another embodiment of the invention, it is effective that the image output controller is arranged so as to be on standby in a process related to at least one of user's settings of the printing position of the color chart, the layout of the color chart and the color value of the color chart, until receiving a predetermined instruction of termination in a state where at least one of the user's settings of the parameters is allowable.

According to the arrangement, the predetermined instruction of termination is received after the predetermined parameters have been set by the user. Thus, the image output controller can proceed to a subsequent process smoothly with minimum time for setting (time does not need to pass uselessly since the user can make a suitable determination.)

In another embodiment of the invention, it is effective that the image output controller is arranged so that in a process related to the user's setting or automatic optimization of the color value of the color chart, a color value of any combination or a color value of an optimum combination based on a predetermined condition is selected as a color value of the color chart, the color value being selected from choices including at least a color chart group defined by a color ratio of a monochromatic phase to a reference color and a color chart group related to a specific color sample.

The color reproducibility can be classified into various types when seen microscopically. Accordingly, there are a various types of color charts which are used in the aforesaid color authentication. Generally, for example, a color chart defined by a color ratio (rate) of a monochromatic phase (for example, a color phase of ink used in printers, RGB (red, green and blue), etc.) to a reference color (while, for example) is used as a color value of color chart used in the color authentication. However, it is important that the foregoing color authentication is carried out regarding other specific color values so that it is certified that print is printed in a correct color.

In this regard, a color value of a color chart to be employed is selected from an option including at least choices including at least a color chart group defined by a color ratio of a monochromatic phase to a reference color and a color chart group related to a specific color sample. Accordingly, even when either or both color values are necessitated, the image output controller can cope with the case flexibly.

The aforesaid optionally defined specific color value may include, for example, a color value corresponding to an optional corporate color, a color chart group of various flesh colors (important colors) important in figure painting, a color value according to various color sample books (for example, such books issued by printing and design makers) or color values according to various color chart books (for example, JIS standard color chart, color chord manual, etc.)

According to another embodiment of the invention, it is effective that the image output controller is arranged so that the printer repeats both printing while paper feed is stopped and paper feed every line in a widthwise direction of the paper perpendicular to a direction of paper feed, thereby printing any image on predetermined printing paper and so that in a process related to automatic optimization of the layout of the color chart, in order that a printing position of the printer and a color measuring location of the color measuring apparatus may be consistent with each other, the number of color charts per unit width in the feed direction of the printing paper is automatically set according to a time ratio of a printing time while feed of the printing paper is stopped and a time necessary for the color measuring apparatus to scan one widthwise line of the printing paper. According to the arrangement, the printing position of the printer and the color measurement position of the color measuring apparatus are synchronized with each other every line, whereupon error cam be prevented in the color measurement. Moreover, since the synchronization is realized by changing the color chart layout of the color chart, a printing time need not be changed (for example, increased) in the color measurement and delay in the printing resulting from the change in the printing time can be prevented.

According to another embodiment of the invention, it is desirable that even while the printer is printing another image on the same paper after printing of the color chart, the color measuring apparatus is provided so as to be capable of carrying color measurement for the color chart simultaneously the printing (for example, mounted on the printed).

Printing and color measurement are efficiently carried out in such a printing system as described above (the system which can carry out printing and color measurement concurrently. Accordingly, the system is effective particularly when used for producing the above-described certificate (proof) of color authentication easily and promptly. However, the color measurement cannot usually be carried out exactly unless the feeding of printing paper is stopped. Accordingly, the printer (particularly, feed timing) and the color measuring apparatus (particularly, scan start timing and scan termination timing) need to be synchronized with each other. In this regard, too, the user's setting or automatic optimization of the printing position of the color chart and color chart layout are carried out in the apparatus during the above-described color authentication, the printing position of the color chart or color chart layout can be determined while synchronization in the color measurement is considered.

According to another embodiment of the invention, an image output controller is arranged to be capable of directly or indirectly controlling a printer which prints a color chart comprised of an optionally settable color chart only for a purpose of color measurement using a suitable color chart without sticking to color authentication of a specific image, and a color measuring apparatus carrying out color measurement of the color chart, wherein a process is carried out in relation to user's setting or automatic optimization including at least one of a printing position of the color chart, a layout (including a shape, number and size of the color chart) of the color chart and a color value of the color chart and thereafter; the color chart is printed on a predetermined sheet of printing paper by the printer according to a printing condition which is based on the user's setting or the automatic optimization; and color measurement is carried out for the printed color chart by the color measuring apparatus, the image output controller being particularly effective when used to produce the certificate of color authentication (proof).

BRIEF DESCRIPTION OF THE DRAWINGS

Other objects, features and advantages of the present invention will become clear upon reviewing the following description of the preferred embodiment, in which:

FIGS. 2A, 2B and 2C are perspective, plan and side views of a printer employed in the system respectively;

FIGS. 8A to 8D show a frame format of a modified form of the proof (certificate of color authentication) to be produced;

FIGS. 9A to 9D show a frame format of another modified form of the proof (certificate of color authentication);

FIG. 10 shows an example of processing table used in the process related to automatic optimization with respect to parameters of the color chart;

DETAILED DESCRIPTION OF THE INVENTION

One embodiment of the image output controller of the present invention will be described with reference to FIGS. 1 to 7. The image output controller of the embodiment is intended to be used to produce the aforesaid certificate of color authentication (proof) as in the apparatus described in the above-described patent document.

Figure 1:
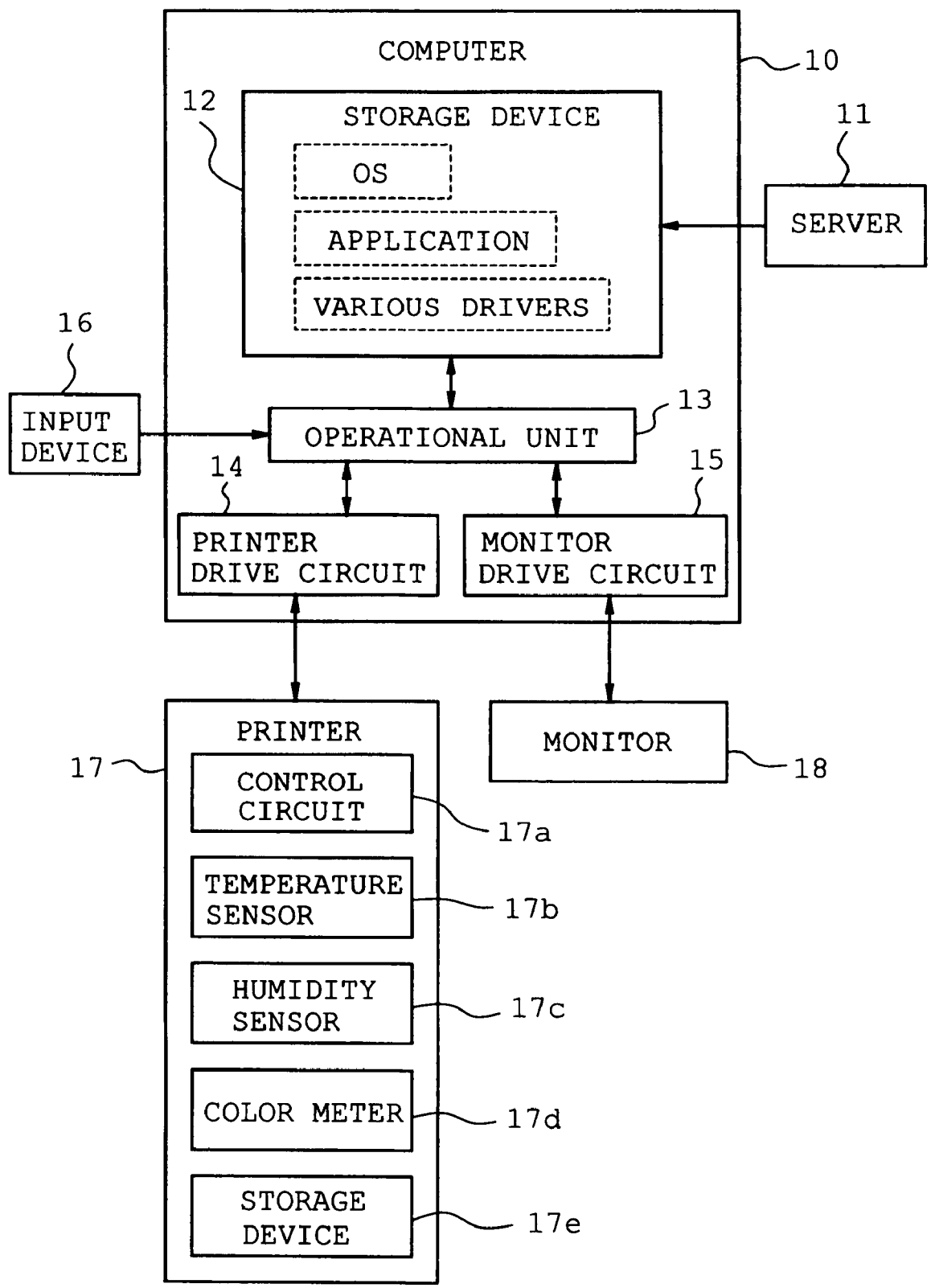
FIG. 1 is a schematic block diagram showing an arrangement of an image output (printing) system which is one embodiment of an image output controller of the present invention.

Referring to FIG. 1, an outline of the image output (printing) system will be described. FIG. 1 is a schematic block diagram showing an arrangement of an image output (printing) system. The system comprises a monitor 18 used as a display device for a computer (a computer 10, herein), ink-jet color printer 17 and the computer 10 (an image output controller) performing predetermined image processing based on outputs of these image output apparatuses.

A server 11 manages various information, as digital data, including various images (objects to be certified), information about allowable color range for every image (used in authentication), various color charts and the like. The data are numbered, for example, and managed in types or individually. A part or all of users are allowed to download the data so that data the user desires can be provided properly. Furthermore, an input device 16 comprises a mouse and a keyboard and is operated by the user so that the intension of the user is reflected on the operation of the computer 10.

More specifically, the computer 10 (the image output controller) is provided with a storage device 12 comprising a hard disc drive and a read only memory (ROM). The storage device 12 stores an operating system (OS), application software, various drivers (software) including printer driver, monitor driver, drivers of the input device 16 and a color conversion table (lookup table: LUT) in which a gradation sequence of cyan, magenta, yellow and black (CMYK) are correlated to a gradation sequence of red, green and blue (RGB) so that the same color is reproduced. Furthermore, various pieces of information provided by the server 11 are adapted to be supplied into the storage device 12.

The computer 10 includes an operational unit 13 comprising a central processing unit (CPU) (a basic processing unit) and a random access memory (RAM), a printer driver circuit 14 and a monitor driver circuit 15. The computer 10 is adapted to control the printer 17 and the monitor 18 via these components. The printer 17 is arranged so as to be capable of printing an optional image on predetermined printing paper using an ink of six colors of cyan (C), magenta (M), yellow (Y), black (K), light cyan (c) and light magenta (m). In more detail, when carrying out printing, the printer 17 executes a color conversion process from an RGB color space to a CMY (CMYK) color space while referring to the color conversion table (LUT) stored on the storage device 12.

The printer 17 is provided with a control circuit 17a comprising a central processing unit (CPU) and a random access memory (RAM), a temperature sensor 17b and a humidity sensor 17c each comprising a suitable sensor, a color meter 17d (color measuring apparatus) comprising a spectroscopic color-measuring meter and a storage device 17e comprising a hard disc drive and a read only memory (ROM). The control circuit 17a is adapted to control these components through communication with the computer 10. More specifically, the printer 17 carries out the aforesaid color conversion process while considering printing environment information (temperature and humidity) measured (obtained) by the temperature sensor 17b and the humidity sensor 17c. Furthermore, the printer 17 is supplied with an image which is to be printed and to which various known pretreatments including a resolution conversion process, color conversion process, a halftone treatment, rasterizing treatment and the like have been applied.

FIGS. 2A, 2B and 2C illustrate the construction of the printer 17 and are perspective, plan and side views of the printer. The printer 17 includes an apron EP provided for receiving printing paper RP and a rail RL mounted on the apron EP. The aforesaid color meter 17d is mounted on the rail RL. In printing, the printing paper RP comprising roll paper, for example is set at a predetermined position. The printing paper RP is fed by a predetermined distance in a predetermined direction (feed direction). Upon stop of the feed of printing paper RP, a print head (inkjet head) which is not shown is moved to scan the printing paper widthwise (in the direction perpendicular to the feed direction) with respect to the printing paper RP, thereby printing the printing paper RP. The paper feed and printing are repeated for every widthwise line of the printing paper RP so that an optional image is printed on the printing paper RP.

On the other hand, in color measurement, the color meter 17d sequentially performs widthwise color measurement for a color chart printed on the printing paper RP while sliding (scanning) widthwise with respect to the printing paper RP with the rail serving as a guide. The color chart is, for example, a color chart CP comprising a plurality of patches PT which differ in color phase and gradation, as shown in FIG. 2B.

After the color chart CP has been printed, the color meter 17d is adapted to perform color measurement for the color chart CP concurrently when the printer 17 prints another image (for example, an object to be certified) on the same paper (printing paper RP), as shown in FIGS. 2A-2C. Thus, the color measurement is carried out simultaneously with printing, whereupon the efficiency of each of printing and color measurement can be improved and accordingly, a required time of each treatment can be reduced.

An example of image treatment executed by the aforesaid system will be described with reference to FIGS. 3 to 7. The example is the above-described production of proof (certificate of color authentication). This successive treatment is executed in cooperation among the operational unit 13, control circuit 17a (see FIG. 1), a suitable program and the like.

Figure 3A:
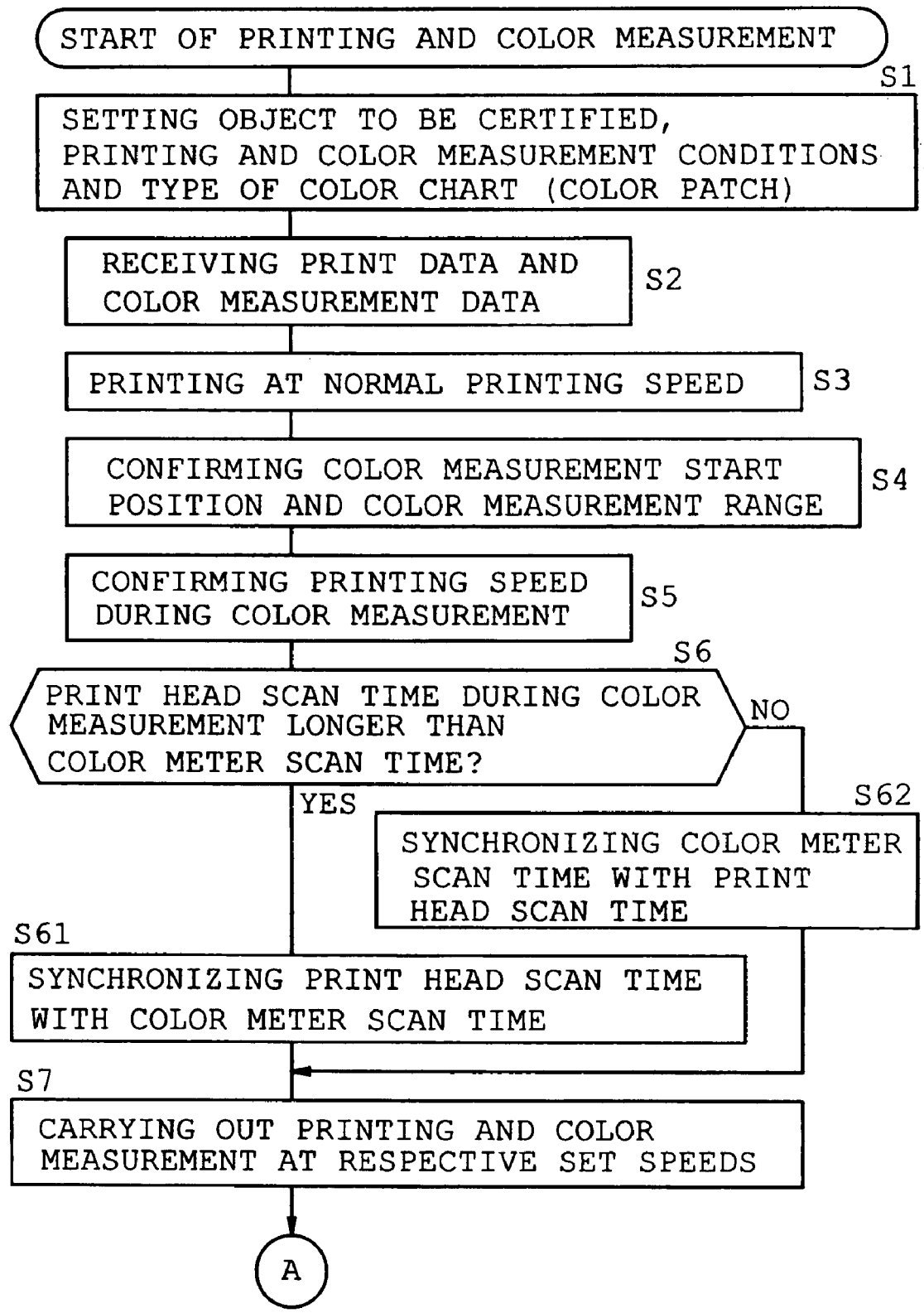
FIG. 3 is a flowchart showing a basic processing procedure of image processing (proof producing process)
Figure 3B:
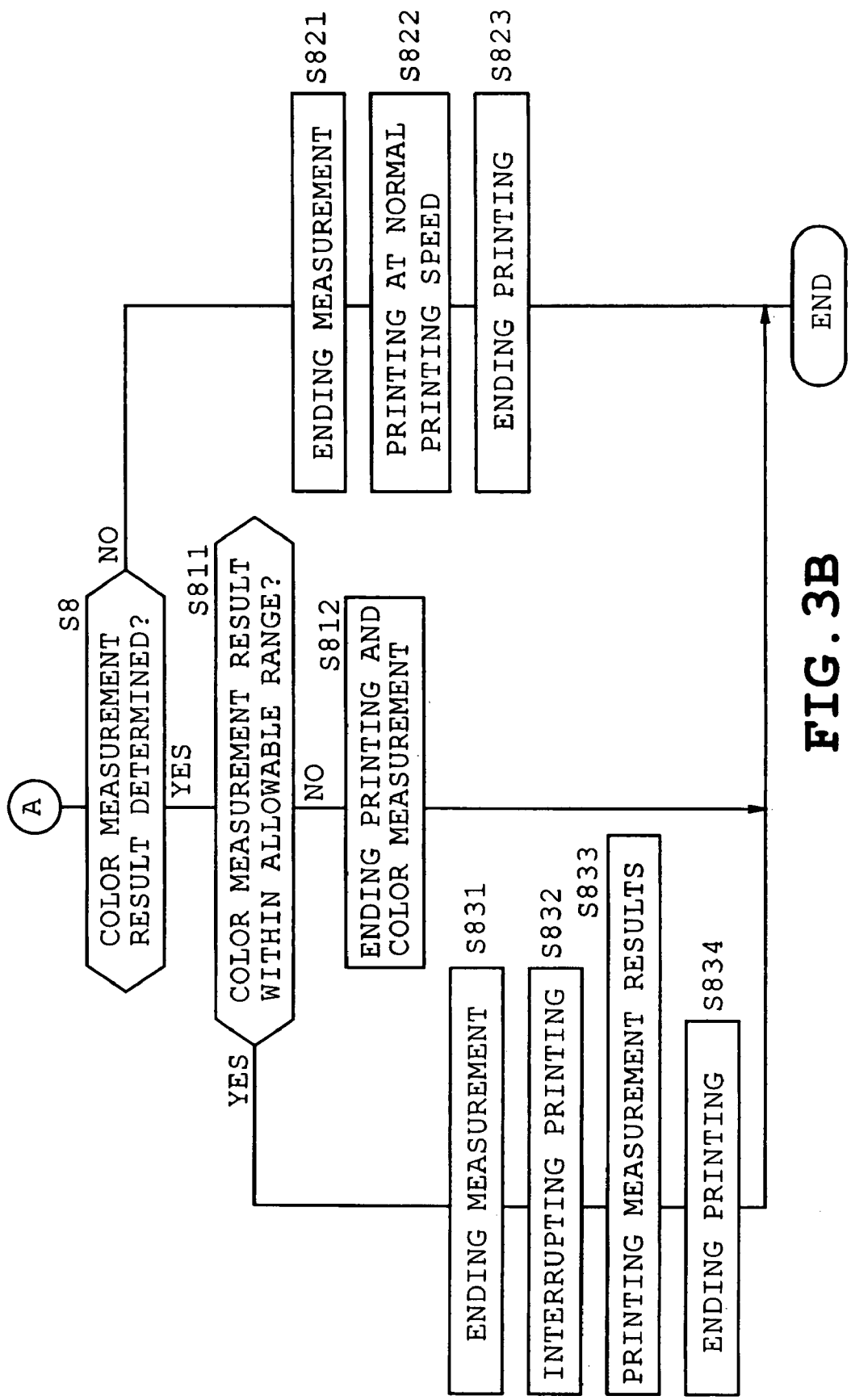

FIG. 3 is a flowchart showing a basic processing procedure of image processing (proof producing process). As shown in FIG. 3, firstly, at step S1, the user selects and sets an image to be certified (object), conditions of printing and color measurement and a type of color chart. More specifically, the user selects and sets a printing position of the color chart, a patch layout of the color chart and a patch color value of the color chart. More specifically, for example, suitable application software is launched so that these parameters are selectable (settable) on the application software. For example, a plurality of options (setting screen) are displayed on a screen of the monitor 18 so that the user can select any one of the options via the input device 16. The control device is on standby until a predetermined end instructing process (for example, selecting a DETERMINATION button on the screen) is carried out by the user. However, when the user selects a CANCEL button on the monitor screen, the successive process is forced to be terminated. The control sequence advances to next step S2 when the aforesaid parameters have been selected and set and the predetermined end instructing process has been carried out.

From the server 11 are downloaded the aforesaid image (object) and printing conditions (for example, printing contents (whether a result of authentication is printed, etc.), printing speed in normal printing, printing speed in color measurement, recording method (unidirectional or bidirectional printing, etc.), print resolution, color/monochrome, size of printing paper, the number of pages to be printed, etc.) and conditions of color measurement (for example, information about allowable color range, color measurement speed, etc.). Alternatively, these pieces of information are optionally set by the user. As a result, the aforesaid image (object) to be certified is set as a printing image together with the color chart.

Figure 4:
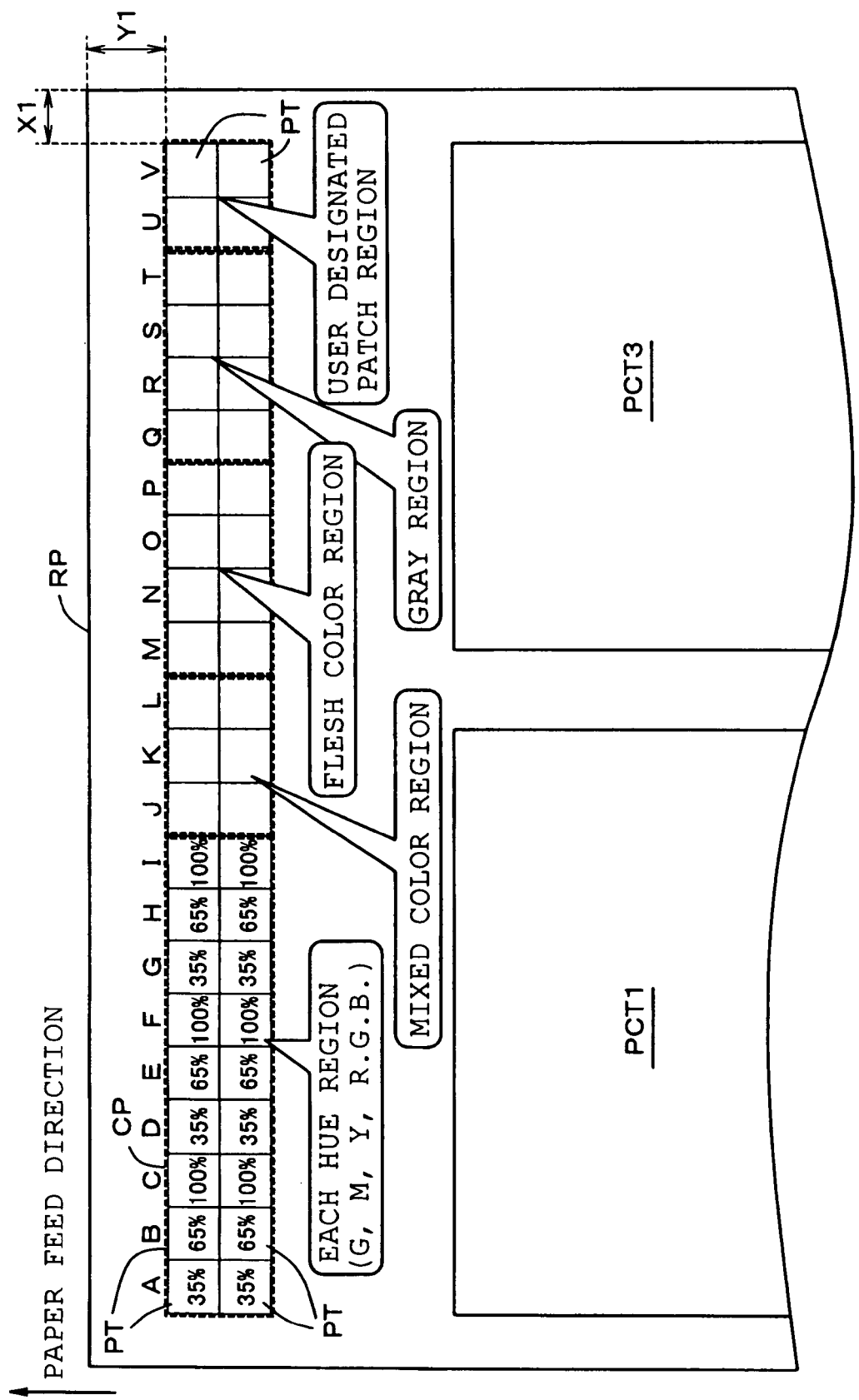
FIG. 4 shows an example of color chart selected and set by the user at step S1 in FIG. 3.

FIG. 4 shows an example of color chart selected and set by the user at step S1. As shown in FIG. 4, a printing position of the color chart is set so that the color chart is printed over the objects (images) PCT1 and PCT3 on the printing paper RP (the side printed in first). Furthermore, a color measurement start position is also set (automatically optimized) according to the printing position. However, the color chart CP can be disposed in the lower part of the printing paper RP since the distance X1 from the end of short side (upper end as viewed in the figure) and the distance Y1 from the end of long side (right end as viewed in the figure) are selectable from options set by the user (for example, numerical input) or prepared previously (for example, downloaded from the server 11).

Furthermore, as shown in FIG. 4, the color chart CP is composed of a plurality of groups of color patches. More specifically, the color patch CP is composed of two color patch groups defined by a color ratio of single hue to reference color (white, for example). In more detail, the two color patch groups include hue regions set to color ratios of 35%, 65% and 100% with respect to hues (C, M, Y) and RGB (red, green, blue) of ink used in the printer 17 and a grey region comprising gray having optionally set different gradations (gray values); a mixed color region obtained by mixing the single hues in the aforesaid color hue regions at a predetermined ratio (for example, 1:1) (for example, "C+M", "C+Y", "M+Y", "R+G", "R+B", "G+B" and the like); a flesh color region comprising a color value of each flesh color (important color) important in figure painting (for example, reddish flesh color, blackish flesh color, whitish flesh color, etc.); and a color patch group optionally designated by the user, more specifically, a user designated patch region comprising a color value corresponding to corporate color, various color sample books (for example, ones issued by print and design makers), a color value according to a color patch collection (for example, JIS Standard Color Patch or Color Balance Manual, etc.), a color value optionally produced (input of numeric values) by the user and the like.

In step S1, since the patch color value of the color chart CP, that is, the types of color patches are settable optionally by the user (for example, numeric input of the color value, selection from previously prepared options (downloaded from the server 11), etc.), the patch color value should not be limited to the above but a color chart having an optional color chart color value may be produced (set).

The embodiment employs, as a color patch layout of the color chart CP, various types of square color patches PT are arranged adjacently into an elongated rectangular shape (2 lines, 22 rows) (FIG. 4). However, this layout may also be settable optionally by the user at step S1 (for example, may be produced on a graphical user interface (GUI) or selected from previously prepared (downloaded from the server 11) options). When the color patch layout of the color chart CP is set, a color measurement range is set (automatically optimized) according to the set color patch layout.

Figure 5A:
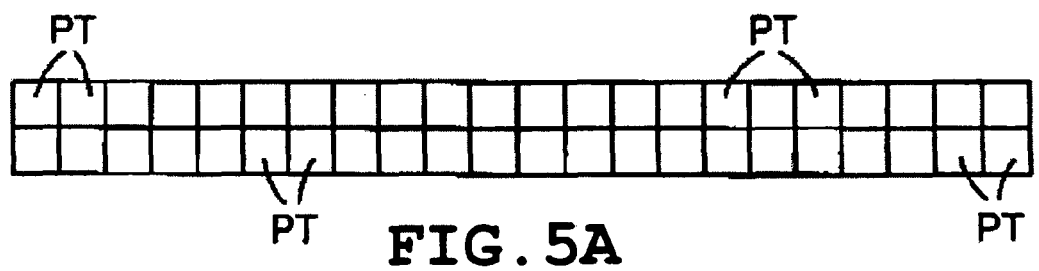
FIGS. 5A to 5C show option of color chart layout of the color chart.
Figure 5B:
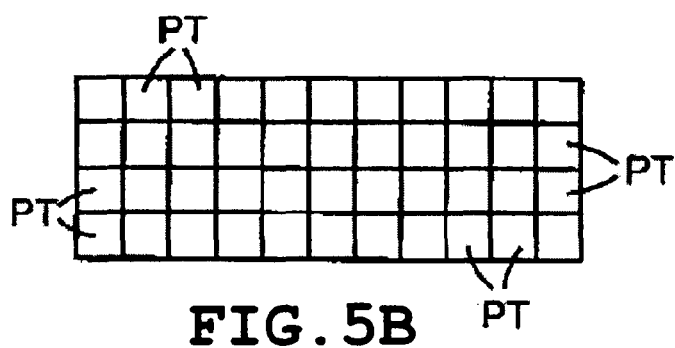
Figure 5C:
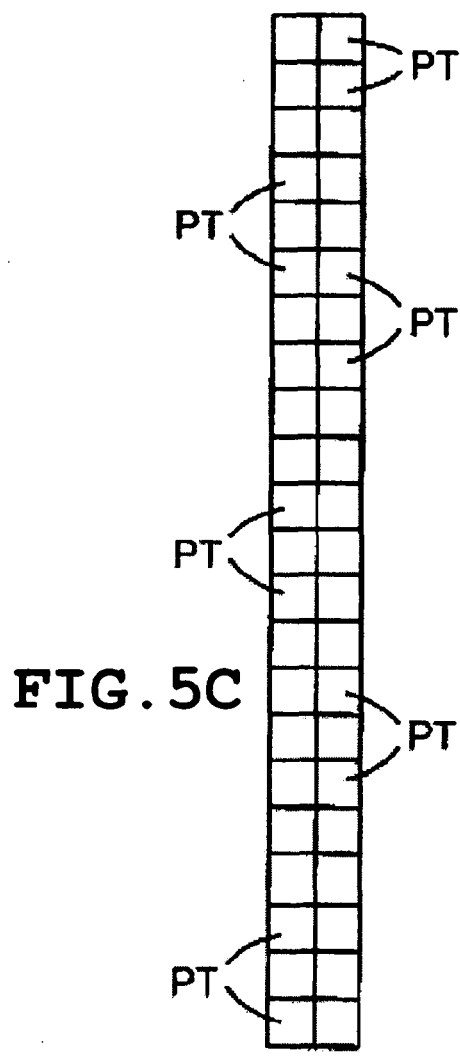

FIGS. 5A to 5C show option of color patch layout of the color chart. As shown in FIGS. 5A to 5c, various layout can be employed as the color patch layout of the color chart, instead of the layout as shown in FIG. 5A. For example, as shown in FIGS. 5B and 5C, a ratio of long and short sides of the rectangular may also be employable (4 lines, 11 rows) or (22 lines, 2 rows). Furthermore, a layout which is not shown, for example, the color patches PT may be arranged into a triangular shape or annular shape, instead of a rectangular shape. Furthermore, the shape, number and size of the color patch may be set optionally by the user.

Thus, in the embodiment, a printing position of the color chart CP, the patch layout of the color chart CP and a patch color value of the color chart CP are selected and set by the user, and the aforesaid color measurement conditions (color measurement start position, color measurement range, etc.) may automatically be optimized upon setting of the parameters.

Subsequently, at step S2 (FIG. 3), the aforesaid set printing data and color measurement data are transmitted from the computer 10 to the printer 17 (thereby to be received by the printer 17). Prior to transmission of the data, known pretreatment (a resolution conversion treatment, a color conversion treatment, a halftone treatment, rasterizing treatment, etc.) are applied via the printer driver (software) to image data (the image of color chart CP (color patch image) and the image to be authenticated) to be printed. The aforesaid printing condition and color measurement condition are added to the treated image data, which are then transmitted to the printer 17.

Subsequently, at step S3 (see FIG. 3), the color chart CP is printed at a usual printing speed by the printer 17. The color measurement start position and color measurement range are confirmed at step S4 and the printing speed is confirmed at step S5. These are collated with the contents of the object to be certified so that a scan time of the print head in the color measurement (the print time with the feed of printing paper RP being stopped) is obtained. At step S6, it is determined whether the aforesaid scan time of the print head in the color measurement is shorter than a scan time of the color meter 17d (the time required for the color meter 17d to scan one widthwise line of the printing paper RP. The determining means can be realized by the operational unit 13, suitable software or the like.

When it is determined at step S6 that the scan time of the print head is shorter than the scan time of the color meter 17d, the scan time of the print head in the color measurement is changed and synchronized (matched) with the scan time of the color meter 17d. On the other hand, when it is determined that the scan time of the print head is not shorter than (is longer than or as long as) the scan time of the color meter 17d, the scan time of the color meter 17d is changed (renewed) at step S6 so as to be synchronized with the scan time of the print head in the color measurement is as long as the scan time of the color meter 17d, the treatment is omitted. More specifically, the shorter scan time is equalized to the longer scan time, that is, a waiting time is set for the print head or the color meter 17d so that the scan time of the print head is synchronized with the scan time of the color meter 17d. When a waiting time to dry (stabilize) printed ink is set, the scan time of the print head is increased, a drying waiting time is set for the color meter 17d.

Figure 6:
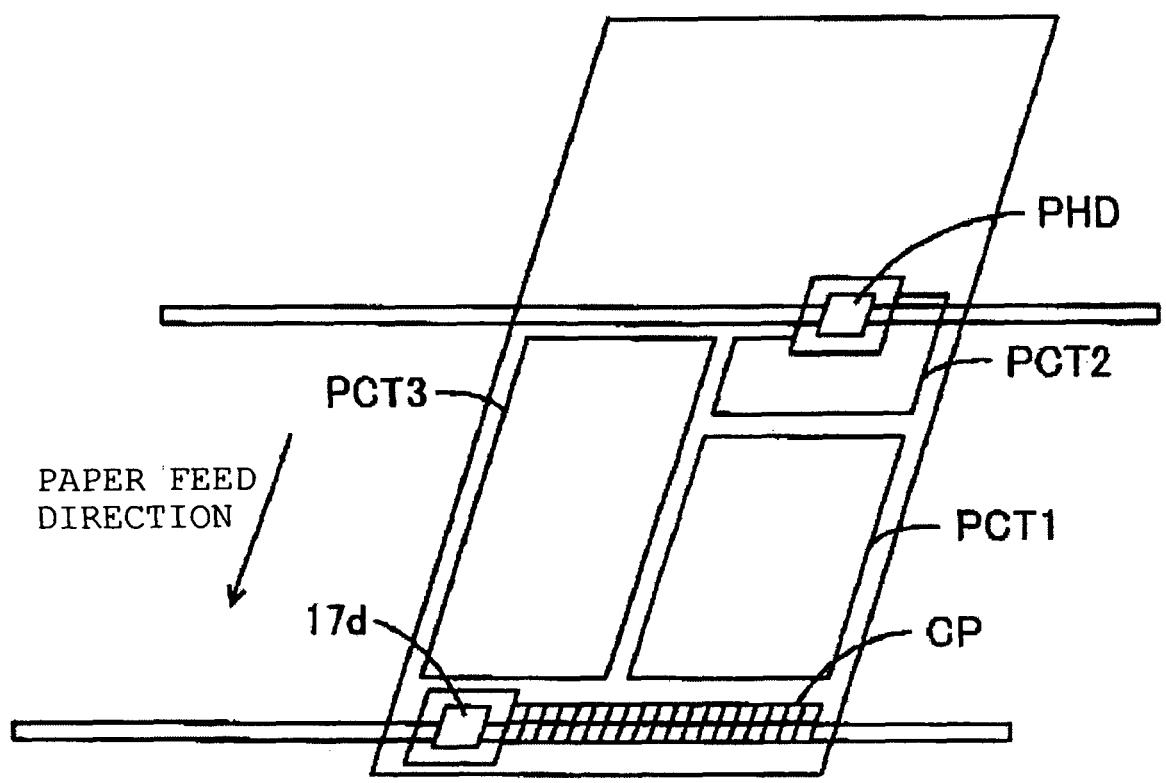
FIG. 6 shows one form in the case where printing and color measurement are simultaneously carried out.

Subsequently, at step S7, print of the object (the image to be certified) and color measurement of the color chart CP are simultaneously carried out with the set scan time of the print head during the color measurement and the set scan time of the color meter 17*d* being applied. FIG. 6 shows one form in the case where printing and color measurement are simultaneously carried out by the printer 17 and the color meter 17*d* respectively.

As shown in FIG. 6, the objects (images) PCT1 to PCT3 are printed by the print head PHD of the printer 17 while color measurement of the color chart CP is being carried out by the color meter 17*d* during the color measurement (the color measurement value is obtained as L*a*b*). In the color measurement, a color measurement value is obtained by the color meter 17*d* at predetermined intervals. Switch between the printing paper RP and patch PT and accordingly switch of the color patch PT which is an object of color measurement is detected based on a periodic color measurement value. As a result, regarding the scan direction of the color meter 17*d* (the direction of short side of the paper), the color measurement start position can be detected from the aforesaid periodic color measurement value. The color measurement start position can be specified when even the color measurement start position is known regarding the feed direction of the printing paper (lengthwise with respect to the printing paper). Furthermore, after start of color measurement, which of the color patches PT is the object of the color measurement, that is, an address of the color patch PT during the color measurement can usually be grasped based on the aforesaid periodic measurement value. Furthermore, when the shape, number and size of the color patches of the color chart CP are previously grasped, a color patch for which color measurement is to be carried out next can be predicted during color measurement (during scan) based on these pieces of information. When a color patch differing from the predicted color patch is recognized, determination of abnormal condition is made (diction of abnormal condition) and the color measurement can be stopped. Thus, the color measurement with high reliability can be realized.

Upon completion of color measurement at step S7, the control sequence advances to step S8 without waiting for completion of the printing. It is determined at step S8 whether the result of color measurement is suitable (suitable/unsuitable). More specifically, execution/non-execution of the determination is selected (set) on the application software via the input device 16 by the user. More specifically, at step S8, it is determined which one of execution/non-execution has been selected.

Subsequently, at step S8, when it is determined that the aforesaid determination is carried out, determination as to whether the result of color measurement is normal is made based on whether the value of color measurement which is the result of color measurement (corresponding to color reproducibility of the printer 17) is within an allowable color range. More specifically, for example, a color difference (ΔE) between a normal color value (target color values) and aforesaid color measurement value is obtained regarding all the color patches for which color measurement have been carried out (all the color patches on the color chart CP). It is determined whether a mean value of the color differences is within a predetermined allowable range (for example, ΔE≦3). This determination (color authentication) is made in cooperation of the control circuit 17*a* (see FIG. 1) with the software loaded in the storage device 17*e*. Thus, in the embodiment, the control circuit 17*a* and the like correspond to a color determining unit.

The determining manner described above is a mere example. Any determining manner may be employed according to use. For example, the object of the determination should not be limited to the mean value of color difference regarding all the color patches on the color chart CP. For example, it may be determined whether all the color differences regarding these color patches are within the aforesaid allowable color range. Furthermore, maximum values may be an object of the aforesaid determination. The aforesaid color allowable range should not be limited to the aforesaid color difference range but may be defined, for example, by a color value or the like. For example, allowable ranges (ranges of error allowed from reference color values) may be set regarding a tristimulus value. In this case, an arrangement is effective in which when the color patch color value of the color chart is set (step S1), the aforesaid allowable color range is set (automatically optimized) according to the set color patch color value of the color chart (the reference value).

When the determination that the result of color measurement is normal (the color measurement value is within the allowable color range) has been made at step S811, the control sequence advances to step S812 where the control device is on standby until the printing (at the normal printing speed) and measurement (calculation (computation) of the color measurement value and the like) are completed. With completion of the treatment, the above-described sequential treatment is terminated.

Figure 7:
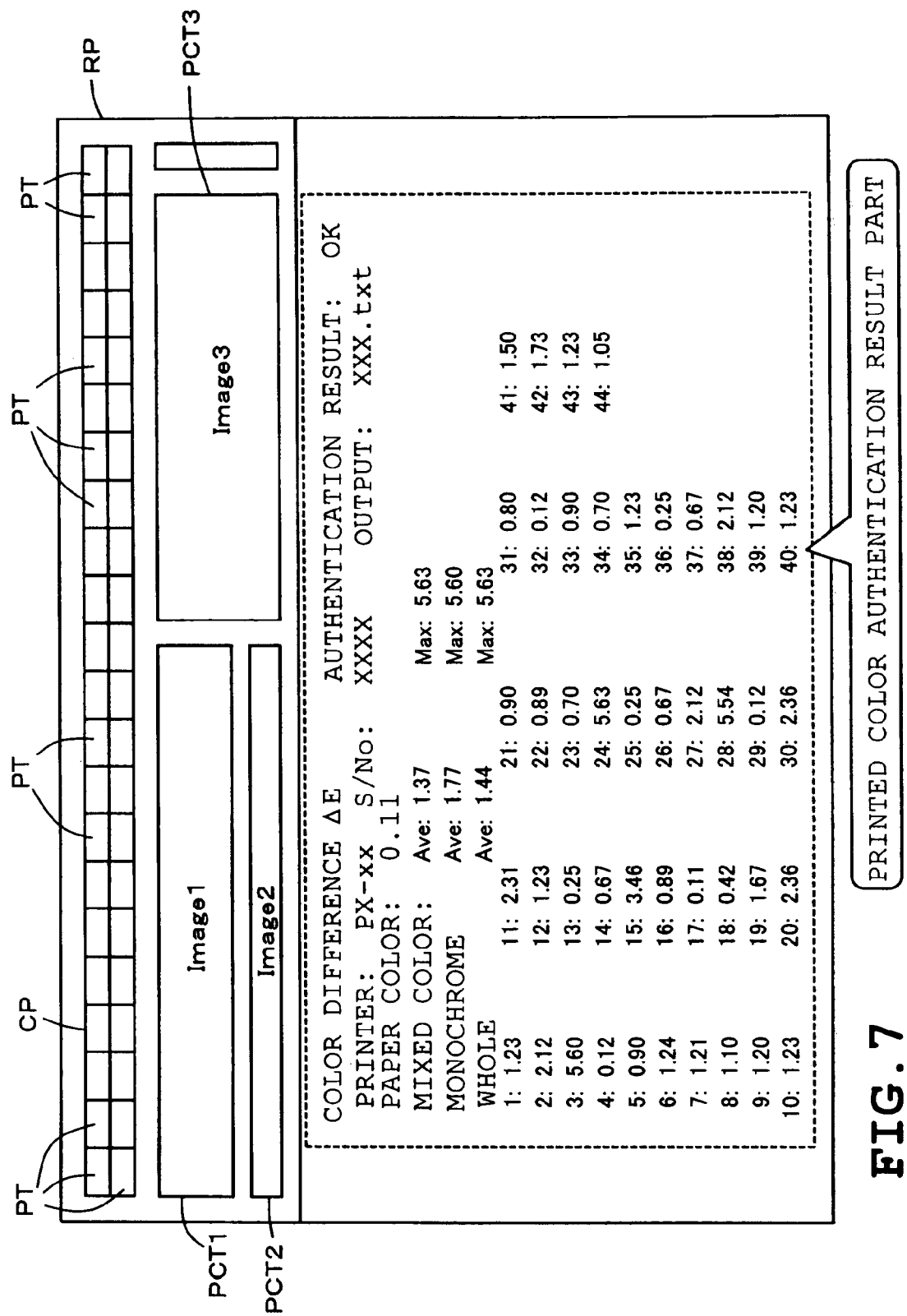
FIG. 7 shows an example of proof (certificate of color authentication) produced with completion of step S812 in FIG. 3.

FIG. 7 shows an example of proof (certificate of color authentication) produced with completion of step S812 in FIG. 3. As shown in FIG. 7, in the above-described step S812, the result of color measurement (color measurement value, mean value, maximum value, etc.), the result of the determination of the result of color measurement (color authentication) (OK/NG (no good)) and the like are printed together with the color chart CP, and the objects (the images to be certified) PCT1 to PCT3. More specifically, on the printing paper RP are printed the date of color measurement, 6/01/12, the name of the printer 17, PX-xx, the serial number of the printer 17, S/No. XXXX, a storage location of the color authentication result (for example, supplied to the server 11 after color measurement), XXX. text, result of authentication (result of determination), OK, color measurement values (color difference) with respect to all color patches PT on the color chart CP, 1 to 44 corresponding to addresses, average value (Ave) and maximum value (Max) of every group of color patch PT (monochrome, color mixture, entirety), measured values of the printing paper RP and the like. These are used as the proof (a certificate of color authentication) for a quality certificate of print, for example.

On one hand, at step S8, when it is determined that the above determination is not carried out, the control sequence advances to step S821 where the measurement (treatment related to color authentication) is terminated, and at subsequent step S822, the object (the image serving as an object of color authentication) is printed. The above-described sequential treatment is terminated with completion (step S823) of this treatment (printing).

On the other hand, at step S811, when it is determined that the result of color measurement is not normal, the control sequence advances to step S831 where the measurement (treatment related to color authentication) is terminated, and at subsequent step S832, even while the object (the image serving as an object of color authentication) is being printed, the printing treatment is interrupted (canceled). When it is before start of printing of the object, subsequent scheduled printing of the object is canceled. Subsequently, the control sequence advances to step S833 where the result of color measurement (color measurement value, mean value, maximum value, etc.), the result of the determination of the result of color measurement (color authentication) (for example, NG) and the like are printed in the same manner as when it is determined that the result of color measurement is normal. The above-described sequential treatment is terminated with completion (step S834) of this treatment (printing).

As obvious from the foregoing, the following effect can be achieved from the image output controller of the embodiment:

(1) When color authentication is executed for an optionally set objects (the images to be certified) PCT1 to PCT3, a process is carried out in relation to user's setting including a printing position of the color chart CP, a color patch layout of the color chart CP and a color value of the color chart. Color measurement is carried out by the color meter 17d (color measuring apparatus) for the color chart CP printed according to the printing conditions based on the user's setting. As a result, the aforesaid color authentication is carried out in an optimum form according to use.

(2) When the result of the color measurement is normal regarding the color measurement by the color meter 17d, the color chart CP, the objects (the images to be certified) PCT1 to PCT3, the results of color authentication (the result of color measurement, the result of determination, etc.) and the like are printed on a single sheet of paper in continuity. As a result, the certificate of color authentication (proof) can be produced easily but accurately.

(3) Moreover, user's preference can be reflected since the printing position, color patch layout and color chart color value are set as optimum values at user's option.

(4) Each parameter of the color chart CP is set optionally by the user. Accordingly, even when various pieces of hardware (components) such as the aforesaid printer 17 and color meter 17d is changed (for example, model change), the above-described arrangement can cope with the change flexibly.

(5) Furthermore, since an automatic optimization of color measurement conditions (start position of color measurement, color measurement range, allowable color range, etc.) is carried out together with setting of these parameters, optimum color measurement conditions are automatically set according to the parameters (printing position, color patch layout, color chart color value) related to the color chart.

(6) The color determining unit is provided which determines whether the result of color measurement is normal, depending upon whether the result of color measurement is within a predetermined allowable color range (for example, realized by the control circuit 17a, suitable software and the like). When the color determining unit determines that the result of color measurement is not normal, printing of the object (the image which is the object of color authentication) is canceled (step S832 in FIG. 3) when the printing is scheduled after printing of the color chart or interrupted in a case where the image is being printed after the color chart has been printed. When the color determining unit determines that the result of color measurement is normal, the image which is the object of the color chart is printed together with a result of determination by the color determining unit (step S812 in FIG. 3). Thus, when the result of color measurement by the color measuring apparatus is not normal, the object is not printed. As a result, consumable goods of the printer, such as ink can be saved. Furthermore, when the result of color measurement is normal, the object (image as the object of color authentication) is printed as well as the result of determination for the color authentication (suitable or unsuitable). As a result, high-value added proof can automatically be produced.

(7) The image output controller is arranged so as to be on standby (step S1 in FIG. 3) in a process related to at least one of user's settings of the printing position of the color chart, the layout of the color chart and the color value of the color chart, until receiving a predetermined instruction of termination in a state where at least one of the user's settings of the parameters is allowable. As a result, since the user determines suitably, time can be saved. Thus, the control sequence can advance to a subsequent process more smoothly with a minimum necessary time for the settings. However, this arrangement is not essential, and, for example, the image output controller may be arranged so that the process related to the user's settings is terminated upon lapse of a predetermined time by a suitable timer without user's instruction of termination.

(8) The image output controller is arranged so that in the process related to the user's setting of the patch color values of the color patch CP, any combination of color values is selected as the patch color values of the color patch CP from options including a color patch group defined by a color ratio of single hue to reference color (white, for example) and a color patch group comprising optional specific color values. As a result, even a case where either one or both of these color patch groups are necessary can be coped with flexibly.

(9) After the color chart CP has been printed, the color meter 17d is adapted to perform color measurement for the color chart CP concurrently when the printer 17 prints another image (for example, an object to be certified) on the same paper (printing paper RP). Thus, the printing and color measurement are carried out efficiently, whereupon the certificate of color authentication (proof) can be produced easily and quickly.

The foregoing embodiment may be modified as follows. A predetermined color recovery process (calibration) may be carried out for the printer 17 when it has been determined that the result of color measurement is not normal. This arrangement is beneficial in order that the color reproducing characteristic of the printer 17 may be kept proper.

The produced proof (certificate of color authentication) should not be limited to the example shown in FIG. 7. For example, a printed part of color authentication result in FIG. 7 may be modified into forms as shown in FIGS. 8A to 8D and FIGS. 9A to 9D. More specifically, for example, as shown n FIG. 8A, the result (OK/NG) of determination (color authentication) of color measurement result may be eliminated. In FIG. 8A, the types of color patches PT are distinctly displayed by addresses (A1 to V1, A2 to V2) on the color chart CP. Furthermore, regarding the aforesaid user designated patches, information to specify the colors or types of color coordinate system and color values may be displayed. The information to specify the colors may include types of color samples and types of color patches such as (color sample A, orange) or (color sample B, dark blue). The types of color coordinate system and color values may be exemplified as $L^*a^*b^*(50, -70, 20)$ or $L^*a^*b^*(20, 30, -40)$. Furthermore, regarding color patches (definition patches) other than the user designated patches, previously prepared files (file name, PX-9xxx_PGPP_2814_Standard) may be downloaded from the server 11. In this case, the file name is also printed as the proof.

Furthermore, as shown in FIGS. 8A to 8D, unnecessary information may be eliminated accordingly. For example, only mean value or maximum value of each predetermined color patch group (all, gray, flesh color, C, M, Y, R, G, B) may be displayed as shown in FIGS. 8B and 8C. Alternatively, only the mean value or maximum value of all color patches on the color chart CP may be displayed as shown in FIG. 8D.

FIGS. 9A to 9D show a frame format of an example of the proof (certificate of color authentication) in the case where it has been determined at step S811 in FIG. 3 that the result of color measurement is not normal. As shown in FIGS. 9A to 9D, when it has been determined that the result of color measurement is not normal, an indication of NG is printed as the result of determination (color authentication) of the color measurement result, as shown in FIGS. 9A to 9D. Furthermore, for example, as shown n FIGS. 9A and 9B, a part (V1, Y) which is not normal may be surrounded with a frame (shown by broken line in the figures) so as to be visually recognizable, whereupon an unsuitable part can easily be confirmed (visually recognized) even when the number of results of color measurement is large. Furthermore, as shown in FIG. 9C, a normal part (Entirety (Ave)) may be surrounded with a frame (shown by broken line in the figures) so that a part which is not normal is visually recognizable. Still furthermore, as shown in FIG. 9D, a mark H1 may be put on a part which is not normal (Entirety (Max)). In this case, the mark H1 may be put when the color measurement value is larger than an allowable range (equal to or larger than an upper limit value). A mark H2 may be put when the color measurement value is equal to or larger than 2. A mark L1 may be put when the color measurement value is smaller than the allowable range (equal to or larger than a lower limit value) A mark L2 may be put when the color measurement value is equal to or larger than 2. A mark L3 and so on may be put when the color measurement value is equal to or larger than 2 and so on. Thus, it is effective that the color measurement value may clearly be shown. Additionally, a print color may be changed so that a part which is not normal may visually be recognizable. For example, a normal part is printed in black and a part which is not normal is printed in red.

In the foregoing embodiment, the printing position of the color chart CP, the color patch layout of the color chart CP and the color patch color value of the color chart CP are set by the user. However, not all the parameters need be settable. When at least one of the parameters may be settable, substantially the same effect as the above paragraph (1) can be obtained.

Furthermore, an automatic optimization process may be carried out for these parameters according to printing requirements, instead of the user's setting process, so that the parameters are automatically set to optimum values. In the automatic optimization process, a processing program may be provided in which a plurality of predetermined processes are uniquely set so as to correspond to a plurality of predetermined conditions respectively. It is determined which one of the conditions is pertinent. This determining unit may be realized by the aforesaid operational unit 13, suitable software or the like. The determining unit may refer to the processing table and be arranged to carry out a predetermined process specified regarding the condition determined to be pertinent.

FIG. 10 shows an example of processing table used in the process related to automatic optimization with respect to parameters of the color chart. As shown in FIG. 10, in this table, predetermined processes are specified so as to correspond to conditions such as client (company A, company B, etc.), products (books, gravure, etc.) or the like. More specifically, uniquely are specified processes to set the type of the color chart CP (pattern A1, pattern A2, . . . , pattern X2), allowable color range (range A1, range A2, . . . , range X2) serving as color measurement condition. As a result, processes related to the automatic optimization can be realized (carried out) using the table without complication of control.

Furthermore, when the type of the image (object) to be certified is used as the condition in the processing table, the color value which has a highest importance (or frequency in use) according to the type of the image (object) may be set as the color patch color value of the color chart. For example, a color value of a flesh color may be set in the case of figure painting. As a result, the color patch color value of the color chart CP can be determined in consideration of color measurement contents depending upon the type of the image to be certified (object).

Information (customer information) about conditions in the processing table can be downloaded from the server 11 with the image (object) to be certified, for example. When the process uniquely specified according to the condition on the processing table is downloaded for the server 11 with the image (object), the process concerning the automatic optimization can be realized (carried out) suitably without such a table.

Furthermore, when the automatic optimization is carried out regarding the printing position of the color chart CP, for example, a layout of the object (the image to be certified) is detected. When the image layout to be detected has a space area in which the color chart CP is to be printed, the color chart CP is in the space area. When the image layout has no space area, the color chart CP may be printed on an end of the printing paper RP.

Figure 11:
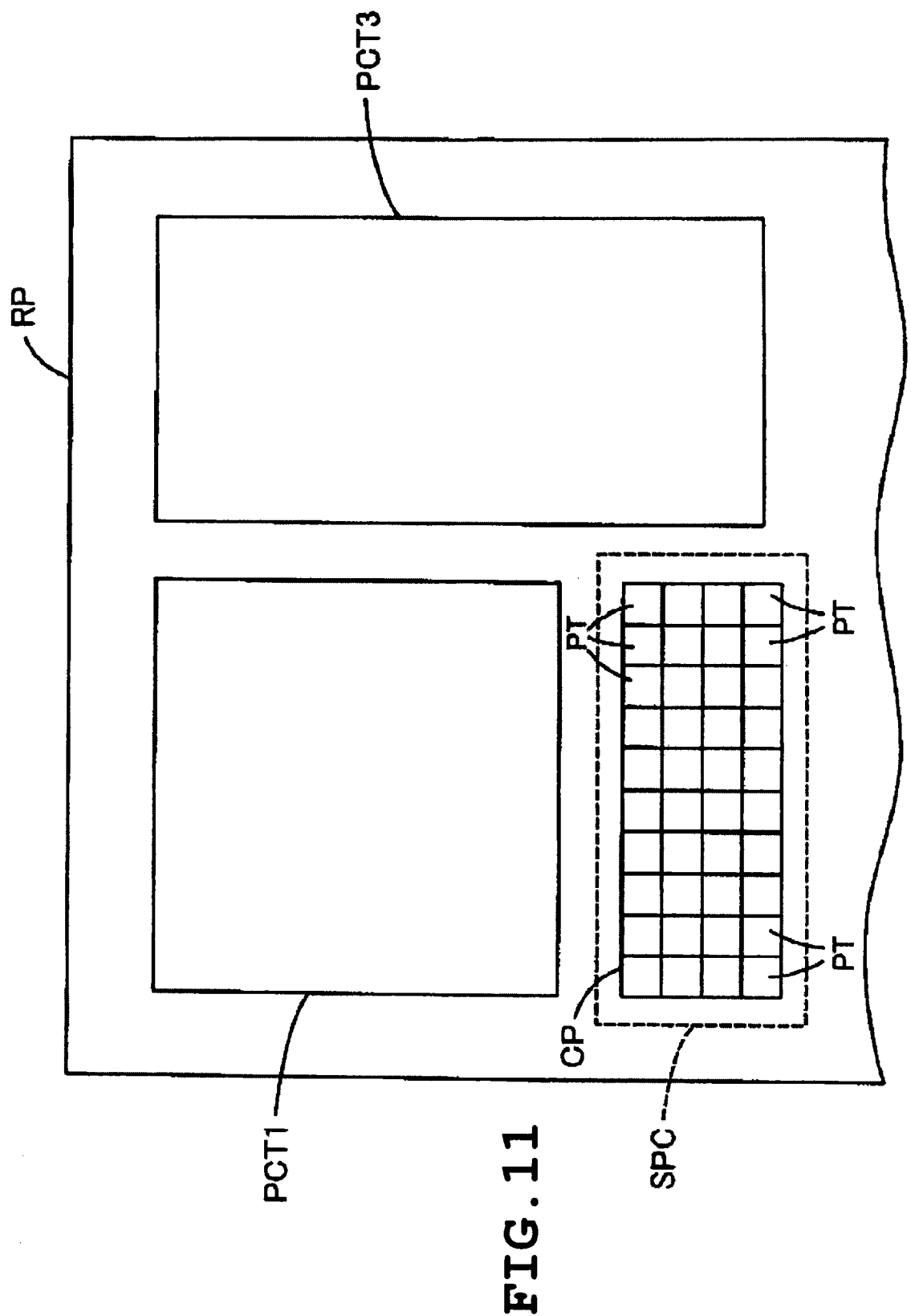
FIG. 11 shows a modified form of the process related to the automatic optimization.

The process concerning the automatic optimization will be described in detail with reference to FIG. 11. FIG. 11 is a pattern diagram of an example of the layout of the object (image to be certified). More specifically, s shown in FIG. 11, when layout of the objects (images to be certified) PCT1 and PCT3 has a space area SPC, the color chart CP is to be printed there. On the other hand, for example, when the layout has no space area as the layout shown in FIG. 7, the color chart CP is printed on an end of the printing paper RP in a manner as shown in FIG. 7.

Thus, when the layout of the object (image to be certified) has a space area, the color chart is printed on the space area, whereupon printing paper can be saved (in the length in case of roll paper and in the number of sheets in case of paper of a predetermined size) and thus, the aforesaid information about color authentication (for example, results of determination, color difference, etc.) can be printed on the saved space. Moreover, when the layout of the object (image which is an object of color authentication) has no space area, the color chart is printed on the end of the printing paper, whereby a printing layout considering the case where the color chart is cut away after printing can be realized.

Furthermore, when the automatic optimization is carried out about the printing position of the color chart CP, an allowable color measurement range (for example, a range in which printing is possible) of the color meter 17d is detected. When the printing position of the color chart CP (scheduled printing position) is outside the allowable color measurement range to be detected, it is effective that the image output controller is arranged to carry out a position correction so that the printing position of the color chart falls within the allowable color measurement range to be detected. As a result, the color chart CP is normally printed so as to fall within the allowable color measurement rang, and accordingly, the color measurement can be carried out with high accuracy (the reliability of the color measurement is improved).

In the foregoing embodiment, a standby time is set for the print head PHD (FIG. 6) or the color meter 17d (FIG. 6) so that scanning by the print head during color measurement and scanning by the color meter 17d are synchronized with each other (steps S61 and S62). However, when the color patch layout of the color chart CP is automatically optimized, the print position of the printer 17 and the color measurement position of the color meter 17d can be rendered consistent with each other. For example, the printer 17 and the color meter 17d may be arranged so that the number of color patches per unit width in the feed direction of the printing paper RP is automatically set according to a time ratio of the scan time of the print head in the color measurement (a printing time while the feed of the paper RP is stopped) and a scan time of the color meter 17*d* (a time required for the color meter 17*d* to scan every widthwise line of the paper RP, whereby the print head and the color meter 17*d* are rendered consistent with each other. Furthermore, the setting of the standby time and the change in the color patch layout may be combined so that the user can select (set) either one of them.

Figure 12A:
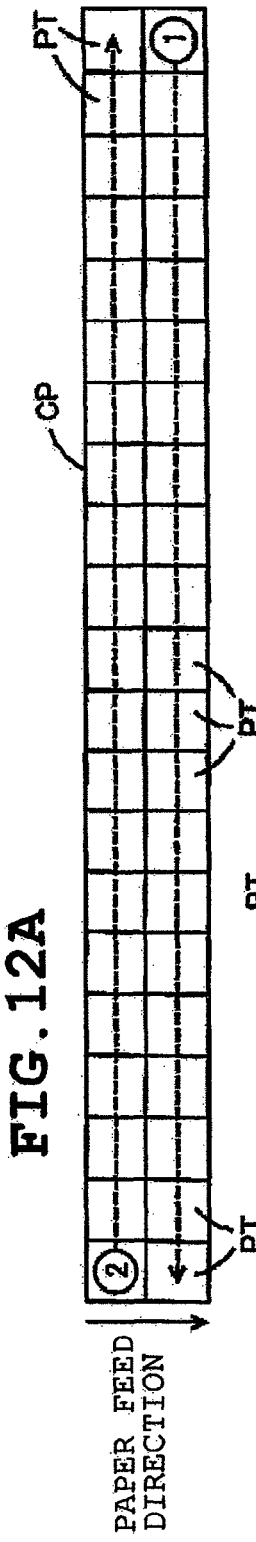
FIGS. 12A to 12D show another modified form of the process related to the automatic optimization.
Figure 12B:
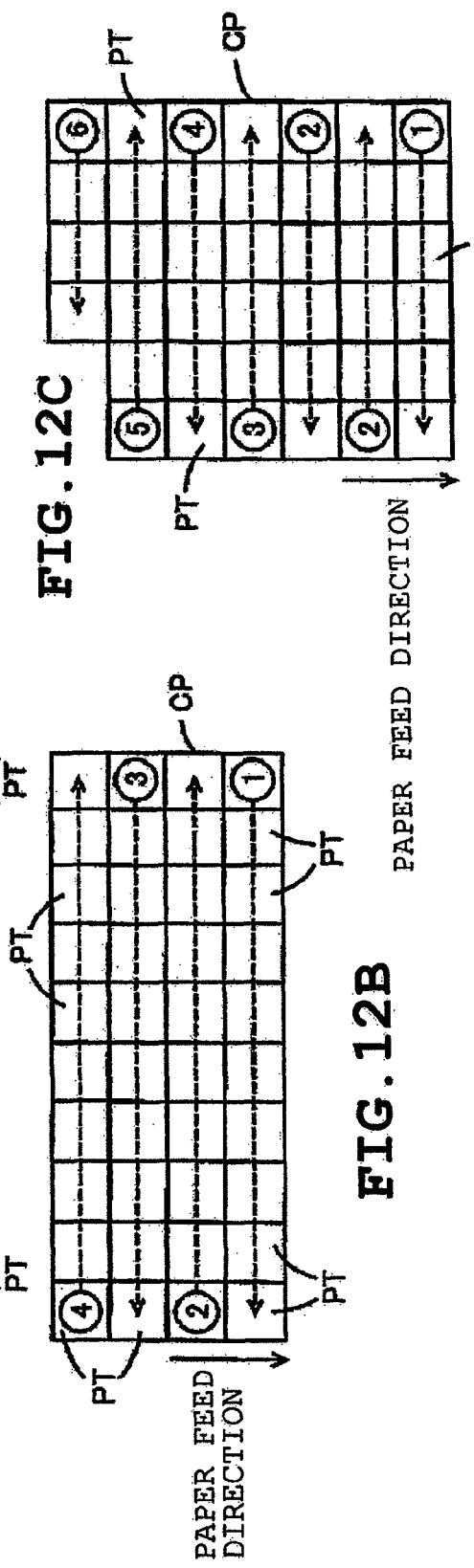
Figure 12C:
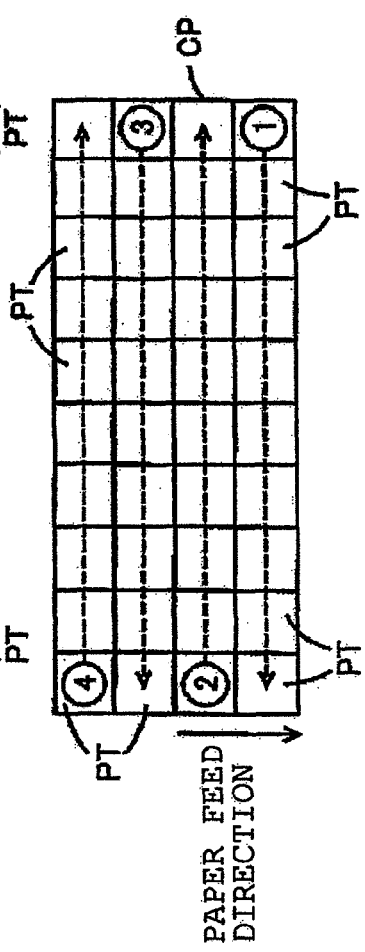
Figure 12D:
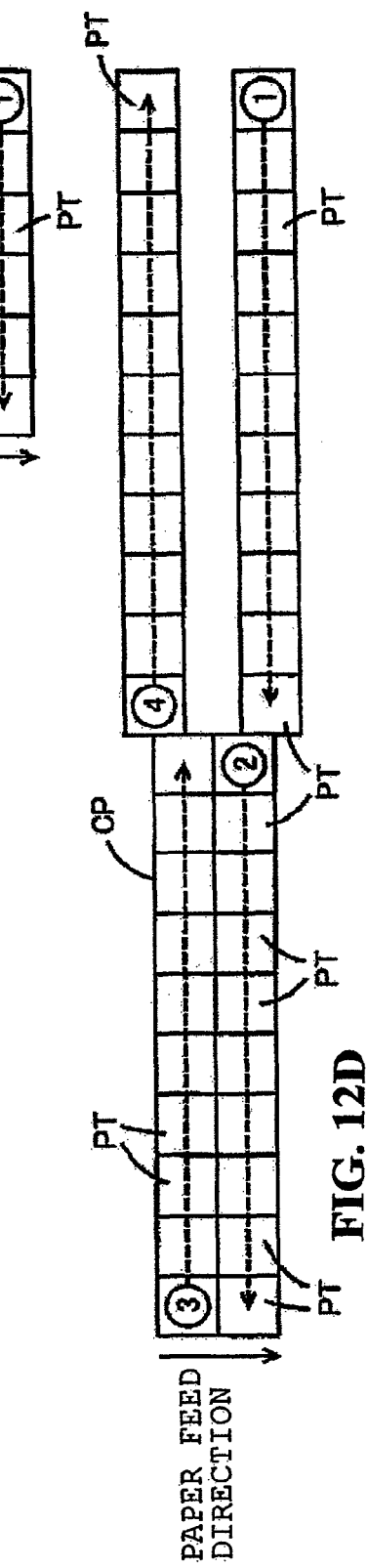

FIGS. 12A to 12D show options of color patch layout in the color chart used in the automatic optimization. The broken-line arrow in the figures designates the scan direction of the cooler meter 17*d* in the color measurement. More specifically, for example, in the color chart CP as shown in FIG. 12A, the number of color patches per unit width in the feed direction of the printing paper RP is 20 per line. The ratio becomes 2 when a scan time ratio of the scan time by the color meter 17*d* to the scan time by the print head in the color measurement is 1 in the synchronized condition. As a result, the synchronous relation cannot be obtained in this case. However, as described above, when the color patch layout is automatically optimized as shown in FIG. 12B, for example, the number of color patches per unit width in the feed direction of the printing paper RP is 10 per line. As a result, the scan time of the color meter 17*d* is shortened to a half (½), whereupon the scan time ratio returns to 1 such that the synchronized relation is re-obtained. Similarly, when the scan time ratio becomes 3, the color patch layout is automatically optimized so that the number of color patches per unit width in the feed direction of the printing paper RP becomes 6 per line, as shown in FIG. 12C. Furthermore, when the ratio becomes 1.5, the color patch layout is automatically optimized so that the number of color patches per unit width in the feed direction of the printing paper RP becomes 20 per 1.5 lines, as shown in FIG. 12D. As a result, the synchronous relation is re-obtained.

Thus, the print position of the printer 17 and the color measurement position of the color meter 17*d* for every line is synchronized with each other when the image output controller is arranged so that the number of color patches per unit width in the feed direction of the printing paper RP is automatically optimized according to the time ratio of the scan time of the print head in the color measurement and the scan time of the color meter 17*d* (scan time ratio). Accordingly, error in the color measurement and the like can be prevented. Moreover, since the printing time in the color measurement need not be changed (no standby time is set), delay in the printing due to the change and the like can be prevented.

In the foregoing embodiment, the objects (images to be certified) PCT1 to PCT3 are printed together with the color chart CP. However, the printing of the object may be eliminated, and only the color chart may be printed and the color measurement may be carried out for the color chart.

Furthermore, the process concerning the automatic optimization may be carried out for only the purpose of color measurement with use of optimum color chart without being caught up with the color authentication of specific image (that is, without execution of color authentication of image) when the process concerning the user's setting or the automatic optimization is carried out regarding the parameters, that is, at least one of the printing position of the color chart, the color patch layout of the color chart and color patch color value of the color chart.

The roll paper is employed as the printing paper RP in the foregoing embodiment. However, the type of printing paper used in the present invention is optional. For example, printing paper of a predetermined size such as A4, B5 or the like may be used, instead. In this case, the foregoing certificate of color authentication (proof) can be produced when the color chart CP, the objects (images to be certified) PCT1 to PCT3 and results of authentication (results of color measurement and determination and the like) are printed continuously on a plurality of sheets of paper but not on a single sheet of paper. However, a single sheet of paper carrying all pieces of information printed looks better.

The computer 10 (the image output controller) is arranged so as be capable of indirectly controlling the color meter 17*d* via the printer 17 in the foregoing embodiment (FIG. 1). However, the computer 10 may only be capable of controlling the printer 17 and the color meter 17*d* directly or indirectly. More specifically, for example, the printer 17 and the color meter 17*d* may be connected to the computer 10 so as to be directly transmissible to the computer so that each of the devices is directly controlled by the computer 10.

The above-described image output controller (computer 10) may be provided (for example, incorporated) in the printer 17. The printer 17 should not be limited to the inkjet color printer but may be replaced by any printer. Furthermore, color meter 17*d* should not be limited to the above-described spectrum color meter but may be any color meter.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. An image output controller which is capable of directly or indirectly controlling a printer printing a color chart comprised of an optionally settable color chart and a color measuring apparatus carrying out color measurement for the color chart, wherein:

when color authentication is executed for an optionally set image, a process is carried out in relation to user's setting or automatic optimization including at least one of a printing position of the color chart, a layout of the color chart and a color value of the color chart;

the printer is controlled according to a printing condition based on the user's setting or the automatic optimization so that the color chart is printed on a sheet of predetermined printing paper;

the color measuring apparatus is controlled so as to carry out color measurement for the printed color chart;

the printer repeats both printing while paper feed is stopped and paper feed every line in a widthwise direction of the paper perpendicular to a direction of paper feed, thereby printing any image on predetermined printing paper; and in a process related to automatic optimization of the layout of the color chart, in order that a printing position of the printer and a color measuring location of the color measuring apparatus may be consistent with each other, the number of color charts per unit width in the feed direction of the printing paper is automatically set according to a time ratio of a printing time while feed of the printing paper is stopped and a time necessary for the color measuring apparatus to scan one widthwise line of the printing paper.

2. The image output controller according to claim 1, wherein when at least a result of the color measurement is normal, the image which is an object of the color chart and color authentication is printed on a single sheet of paper or in continuity on a plurality of sheets of paper.

3. The image output controller according to claim 1, further comprising a color determining unit which determines whether the result of color measurement is normal, depending upon whether the result of color measurement is within a predetermined allowable color range, wherein:

when the color determining unit determines that the result of color measurement by the color measuring apparatus is not normal, printing of the image which is the object of the color chart is canceled when the printing is scheduled after printing of the color chart or interrupted in a case where the image is being printed after the color chart has been printed; and at least when the color determining unit determines that the result of color measurement is normal, the image which is the object of the color chart is printed together with a result of determination by the color determining unit.

4. The image output controller according to claim 1, further comprising a color determining unit which determines whether the result of color measurement is normal, depending upon whether the result of color measurement is within a predetermined allowable color range, wherein:

at least when the color determining unit determines that the result of color measurement is not normal, the image which is the object of the color chart is printed together with a result of determination by the color determining unit and a portion which is not normal is indicated so as to be visually recognizable.

5. The image output controller according to claim 1, further comprising a processing program including a plurality of predetermined processes which are uniquely set so as to correspond to a plurality of predetermined conditions respectively, the image output controller determining which one of the processes of the processing program corresponds to a process related to automatic optimization of at least one of a printing position of the color chart, a layout of the color chart and a color value of the color chart, refers to the processing table, thereby executing the process corresponding to the determined condition.

6. The image output controller according to claim 1, which detects a layout of the image which is an object of the color chart in case of a process related to automatic optimization of the printing position of the color chart, prints the color chart on a space area when the image layout to be detected has the space area, and prints the color chart on an end of the paper when the image layout has no space area.

7. The image output controller according to claim 1, which detects an allowable color measurement range of the color measuring apparatus in case of a process related to automatic optimization of the printing position of the color chart and carries out a location correction when the printing position of the color chart is outside the allowable color measurement range to be detected, so that the printing position of the color chart falls within the allowable color measurement range to be detected.

8. The image output controller according to claim 1, which is on standby in a process related to at least one of user's settings of the printing position of the color chart, the layout of the color chart and the color value of the color chart, until receiving a predetermined instruction of termination in a state where at least one of the user's settings of the parameters is allowable.

9. The image output controller according to claim 1, wherein in a process related to the user's setting or automatic optimization of the color value of the color chart, a color value of any combination or a color value of an optimum combination based on a predetermined condition is selected as a color value of the color chart, the color value being selected from choices including at least a color chart group defined by a color ratio of a monochromatic phase to a reference color and a color chart group related to a specific color sample.

10. The image output controller according to claim 1, wherein even while the printer is printing another image on the same paper after printing of the color chart, the color measuring apparatus is provided so as to be capable of carrying color measurement for the color chart simultaneously the printing.

11. A method of image output control for directly or indirectly controlling a printer printing a color chart comprised of an optionally settable color chart and a color measuring apparatus carrying out color measurement of the color chart, the method comprising:

carrying out a process related to user's setting or automatic optimization including at least one of a printing position of the color chart, a layout of the color chart and a color value of the color chart when color authentication is executed for an optionally set image;

printing the color chart on a sheet of predetermined printing paper according to a printing condition based on the user's setting or the automatic optimization; and carrying out color measurement for the printed color chart by the color measuring apparatus, wherein:

the printer repeats both printing while paper feed is stopped and paper feed every line in a widthwise direction of the paper perpendicular to a direction of paper feed, thereby printing any image on predetermined printing paper; and in order that a printing position of the printer and a color measuring location of the color measuring apparatus may be consistent with each other, the number of color charts per unit width in the feed direction of the printing paper is automatically set according to a time ratio of a printing time while feed of the printing paper is stopped and a time necessary for the color measuring apparatus to scan one widthwise line of the printing paper.

\* \* \* \* \*